(12) United States Patent
Hartikainen et al.

(10) Patent No.: US 6,757,524 B1
(45) Date of Patent: Jun. 29, 2004

(54) DIVERSITY RECEPTION IN A MOBILE COMMUNICATION SYSTEM

(75) Inventors: Jari Hartikainen, Salo (FI); Mika Jäsberg, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/558,995

(22) Filed: Apr. 21, 2000

Related U.S. Application Data (63) Continuation of application No. PCT/FI98/00823, filed on Oct. 22, 1998.

(30) Foreign Application Priority Data

Oct. 22, 1997 (FI) .................................................... 974028
Nov. 10, 1997 (FI) .................................................... 974187

(51) Int. Cl.$^7$ .......................... H04B 7/02; H04B 17/02; H04Q 7/20; H04L 1/02
(52) U.S. Cl. .................... 455/101; 455/432.1; 455/436; 455/439; 455/137; 375/267; 375/347
(58) Field of Search .................. 455/432, 433, 455/434, 436, 437, 438, 439, 440, 441, 442, 443, 444, 449, 422, 132–135, 137, 101–103, 432.1; 375/267, 347; 370/343, 331, 332, 335

(56) References Cited

U.S. PATENT DOCUMENTS 5,697,055 A * 12/1997 Gilhousen et al. .......... 455/33.2
5,850,607 A * 12/1998 Muszynski .................. 455/442

FOREIGN PATENT DOCUMENTS

| DE | 195 47 467 C1 | 12/1995 | |
| FI | 950777 | 8/1996 | |
| WO | 94/30024 | 12/1994 | |
| WO | WO 94/30024 | * 12/1994 | ............ H04Q/7/04 |
| WO | WO 96/02117 | 1/1996 | |
| WO | 96/36191 | 11/1996 | |
| WO | WO 96/36191 | * 11/1996 | ............ H04Q/7/22 |
| WO | 97/29602 | 8/1997 | |
| WO | WO 97/29602 | * 8/1997 | ............ H04Q/7/22 |
| WO | 98/13952 | 4/1998 | |

* cited by examiner

Primary Examiner—William Trost
Assistant Examiner—Meless Zewdu
(74) Attorney, Agent, or Firm—Squire, Sanders & Dempsey L.L.P.

(57) ABSTRACT

The present invention relates to a method for applying diversity reception when signals of a mobile station (MS) are received via at least two separate base stations (BTS1, BTS2). A first base station controller (BSC1) is arranged to forward the signals received from a base station (BTS1) to a second base station controller (BSC2), which is arranged to apply diversity combining to forward the received signals further to a mobile switching center (MSC1, MSC2). In connection with handover, the second base station controller (BSC2) is arranged to forward the signals received from a base station (BTS2) to the first base station controller (BSC1); a connection is set up from the first base station controller (BSC1) to the mobile switching center (MSC1, MSC2); and the first base station controller (BSC1) is arranged to apply diversity combining to forward the received signals further to the mobile switching center (MSC1, MSC2).

8 Claims, 6 Drawing Sheets

— NEW CONNECTION TO NETWORK
----- NEW DIVERSITY BRANCH
• COMBINING POINT

DIVERSITY RECEPTION IN A MOBILE COMMUNICATION SYSTEM

This is a continuation of PCT/FI98/00823 filed Oct. 22, 1998.

The present invention relates to a method for applying diversity reception in a mobile communication system in which signals of a specific mobile station are received via at least two separate base stations, the base stations being arranged to forward the signals they receive to at least two separate base station controllers. The invention further relates to a mobile communication system comprising at least one mobile switching centre, at least a first and a second base station controller which have a data transmission connection with each other and which are arranged to simultaneously receive signals from a specific mobile station, via a first and a second base station, respectively, which have a data transmission connection with them. The invention also relates to a base station controller of a mobile communication system, the base station controller comprising means for receiving signals from a mobile station, via a base station having a data transmission connection with the base station controller.

Previously known is, from CDMA (Code Division Multiple Access) systems, for example, a procedure known as 'soft handover'. In soft handover, diversity combining is applied to receive signals from a specific mobile station via two separate base stations. The mobile station thus moves from one cell to another without any abrupt handover. Instead, handover from one base station to another proceeds gradually as the mobile station approaches a new base station, the new base station thus receiving the signals from the mobile station stronger and stronger. A drawback of this prior art solution is that it unnecessarily loads higher elements of the network hierarchy. The main reason for this is that, in known solutions, the above mentioned higher network elements of the hierarchy, in particular, take care of diversity combining.

An object of the present invention is to eliminate the above drawbacks and to provide a solution for carrying out diversity reception in a mobile network as efficiently and extensively as possible, while causing a minimum load on the network resources. This object is achieved with a method of the invention, characterized by arranging a first base station controller to forward the signals received from a base station to a second base station controller, which is arranged to apply diversity combining to forward the signals received from a base station and from the first base station controller further to a mobile switching centre, whereby a handover involving said mobile station comprises the following:

arranging the second base station controller to forward the signals received from the base station to the first base station controller;

setting up a connection from the first base station controller to the mobile switching centre; and arranging the first base station controller to apply diversity combining to forward the signals received from the base station and from the second base station controller further to the mobile switching centre.

The invention further relates to a mobile communication system to which the method of the invention can be applied. The mobile communication system of the invention is characterized in that the first base station controller is arranged to forward the signals received from the first base station to the second base station controller, which is arranged to apply diversity combining to forward the signals received from the second base station and from the first base station controller further to the mobile switching centre, and that, in connection with handover, the base station controllers are arranged to exchange functions, the second base station controller, which earlier applied diversity combining, thereafter forwarding the signals received from the second base station to the first base station controller, which thereafter forwards the signals received from the first base station and from the second base station controller further to the mobile switching centre.

The invention also relates to a base station controller which can be utilised in the mobile communication system of the invention. The base station controller of the invention is characterized in that the base station controller can be set at least at two alternative modes; in a first mode, combining means of the base station controller are arranged to apply diversity combining to forward the signals received from the base station and from a second base station controller to a mobile switching centre; and, in a second mode, the base station controller is arranged to forward the signals received from said mobile station to said second base station controller.

The invention is based on the idea that a solution which does not unnecessarily occupy the resources available to the system can be obtained by arranging base station controllers to carry out diversity combining in such a way that one of two base station controllers carries out the combining and the data transfer to the mobile switching centre, the other one merely forwarding the signals it receives to the base station controller carrying out the combining. In connection with handover, for example, resources can be thus be saved by arranging the base station controllers to exchange functions: the base station controller that previously carried out the combining can abandon its connection to the mobile switching centre and start to forward the signals it receives to the second base station controller which, in turn, starts to carry out diversity combining and to forward signals to the mobile switching centre. This allows the advantages of soft handover to be made available, without the handover in itself occupying the system any more than a conventional handover applied in the GSM system (Global System for Mobile communications), for example.

Consequently, the most significant advantages the invention offers are that the network elements highest in the network hierarchy are not unnecessarily loaded and that the data transmission connection between the base station controllers is not unnecessarily loaded, because the combined signals can always be forwarded via the shortest route to the mobile switching centre, in other words, direct from the base station controller that carried out the diversity combining.

The preferred embodiments of the method, mobile communication system and base station controller are disclosed in the appended dependent claims 2, 3, 5, 6 and 8.

The invention will be described, by way of example, in greater detail with reference to the accompanying Figures, in which

FIGS. 1a to 1d illustrate how signals from a mobile station MS are forwarded to mobile switching centres MSC1 and MSC2 when the mobile station MS moves from the vicinity of a base station BTS1 to the vicinity of a base station BTS2.

The mobile switching centres shown in FIGS. 1a to 1d can be GSM type mobile switching centres MSC1 and MSC2, whereby for instance the signalling that takes place between them and base station controllers BSC1 and BSC2 in connection with handover thus generally corresponds to a handover in the GSM system. In the case shown in FIGS. 1a to 1d, the radio path between the mobile station MS and the base stations BTS1 and BTS2 is advantageously similar to that of the known CDMA systems, for example.

Figure 1A:
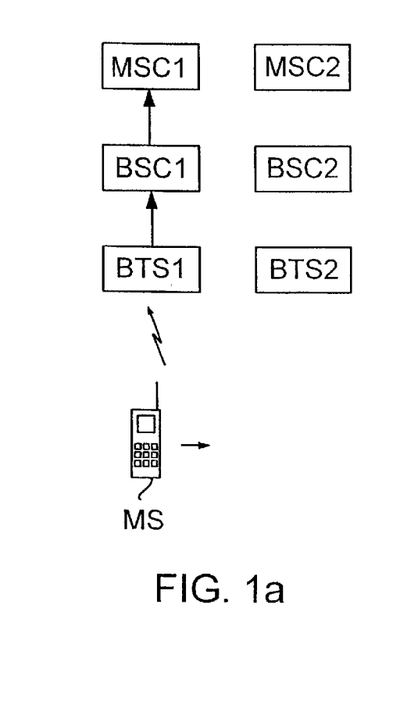
FIGS. 1a to 1d are block diagrams illustrating a first preferred embodiment of a mobile communication system of the invention.

In the situation shown in FIG. 1a, the base station BTS1 alone can receive signals from the mobile station MS (the base station BTS2 being too far away from the mobile station). The base station BTS1 thus forwards the received signals via the base station controller BSC1 to the mobile switching centre MSC1.

Figure 1B:
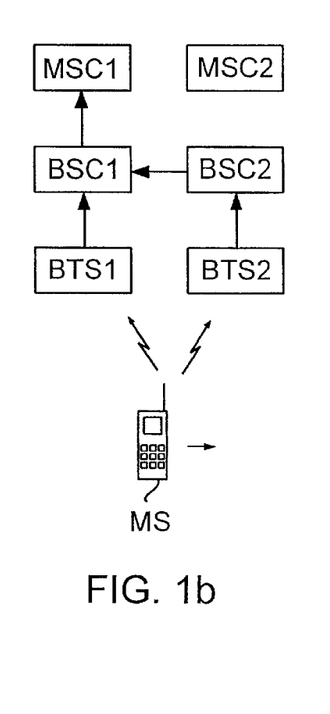

FIG. 1b shows a situation in which the mobile station MS is already closer to the base station BTS2 than in FIG. 1a, the base station BTS1 and the base station BTS2 thus being both capable of receiving signals from the mobile station. In this case, the base station BTS1 forwards the signals it receives to the base station controller BSC1. The base station BTS2, in turn, forwards the signals it receives to the base station controller BSC2. In FIG. 1b, there is no telecommunication connection, allocated to the mobile station MS, from the base station controller BSC2 to the mobile switching centre MSC2, therefore the base station controller BSC2 forwards the signals received from the mobile station to the base station controller BSC1. Two separate signals originating from the mobile station MS are thus forwarded to the base station controller, which then applies diversity combining to the signals and forwards the combined signal to the mobile switching centre MSC1.

Figure 1C:
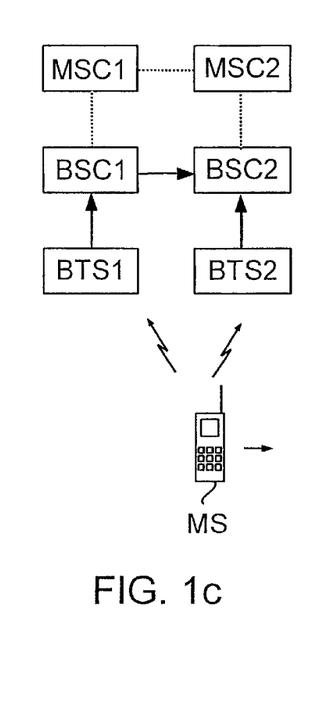
Figure 1D:
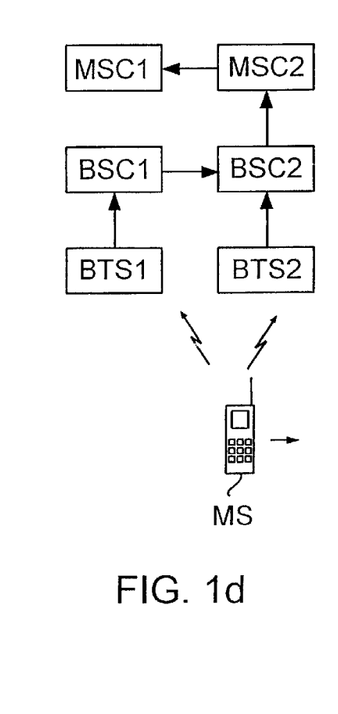

In FIGS. 1c and 1d the mobile station has moved to a location where the audibility of the signals it sends is better via the base station BTS2 than the base station BTS1. In this case, the base station controllers BSC1 and BSC2 exchange functions: the base station controller BSC1, which earlier carried out diversity combining, disconnects the telecommunication connection between the mobile station MS and the mobile switching centre MSC1 and starts to forward the signals received from the base station BTS1 to the base station controller BSC2. Correspondingly, a telecommunication connection is established from the base station controller BSC2 to the mobile switching centre MSC2 and allocated to the mobile station MS. In addition, the base station controller BSC2 starts to apply diversity combining to signals originating from the mobile station MS and received by the BSC2 from the base station BTS2 and the base station controller BSC1, and to forward the combined signals to the mobile switching centre MSC2. Via the connection between the mobile switching centre MSC2 and mobile switching centre MSC1, the signals originating from the mobile station MS are forwarded to the mobile switching centre MSC1, and further to a fixed PSTN network, for example. Consequently, no new connection from the mobile switching centre MSC2 to the PSTN network needs to be established, but the old connection via the mobile switching centre MSC1 can be utilised in future, too. The mobile station MS has thus performed handover from the base station BTS1 to the base station BTS2 in a way that causes a minimum load on the telecommunication connections between the base station controllers and on those between the base station controllers and the mobile switching centres.

Although the example shown in FIGS. 1a to 1d illustrates an embodiment in which the base station controllers are controlled by separate mobile switching centres, a handover taking place as shown in FIGS. 1a to 1d can naturally be carried out in a corresponding manner in a case where the base station controllers BSC1 and BSC2 are controlled by one and the same mobile switching centre.

The example given in FIGS. 1a to 1d illustrates that the base station controller carrying out diversity combining at a particular moment should, according to the invention, have a connection to a mobile switching centre, in order to avoid unnecessary forwarding of the combined signal between separate base station controllers. In other words, when the old connection to the mobile switching centre is released and a new connection from the base station controller carrying out :diversity combining is set up, signals can be forwarded from the mobile station to the mobile switching centre via the shortest route and without unnecessary transmission delays.

Figure 2A:
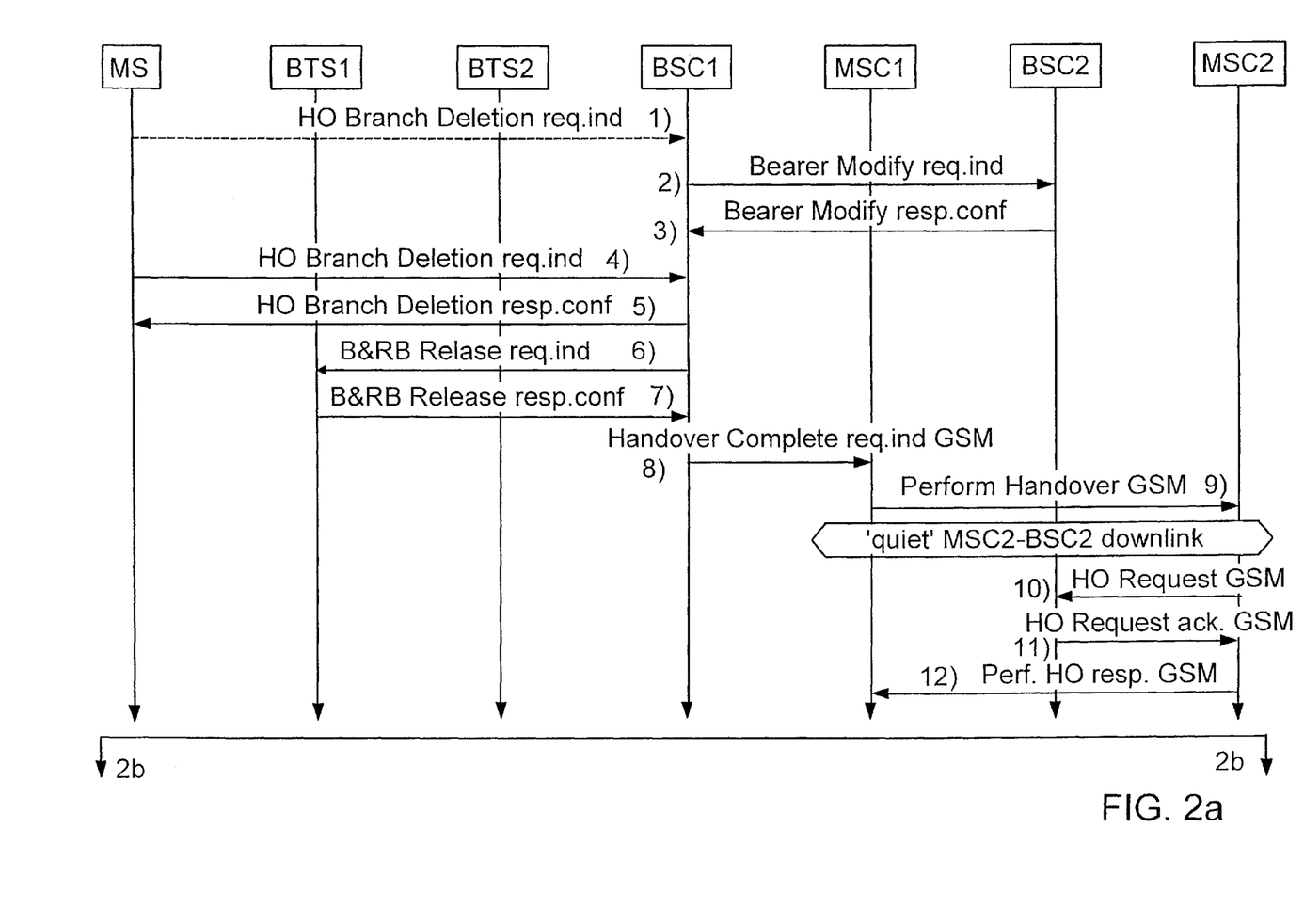
FIGS. 2a and 2b illustrate signalling related to handover in the embodiment shown in FIGS. 1a to 1d.
Figure 2B:
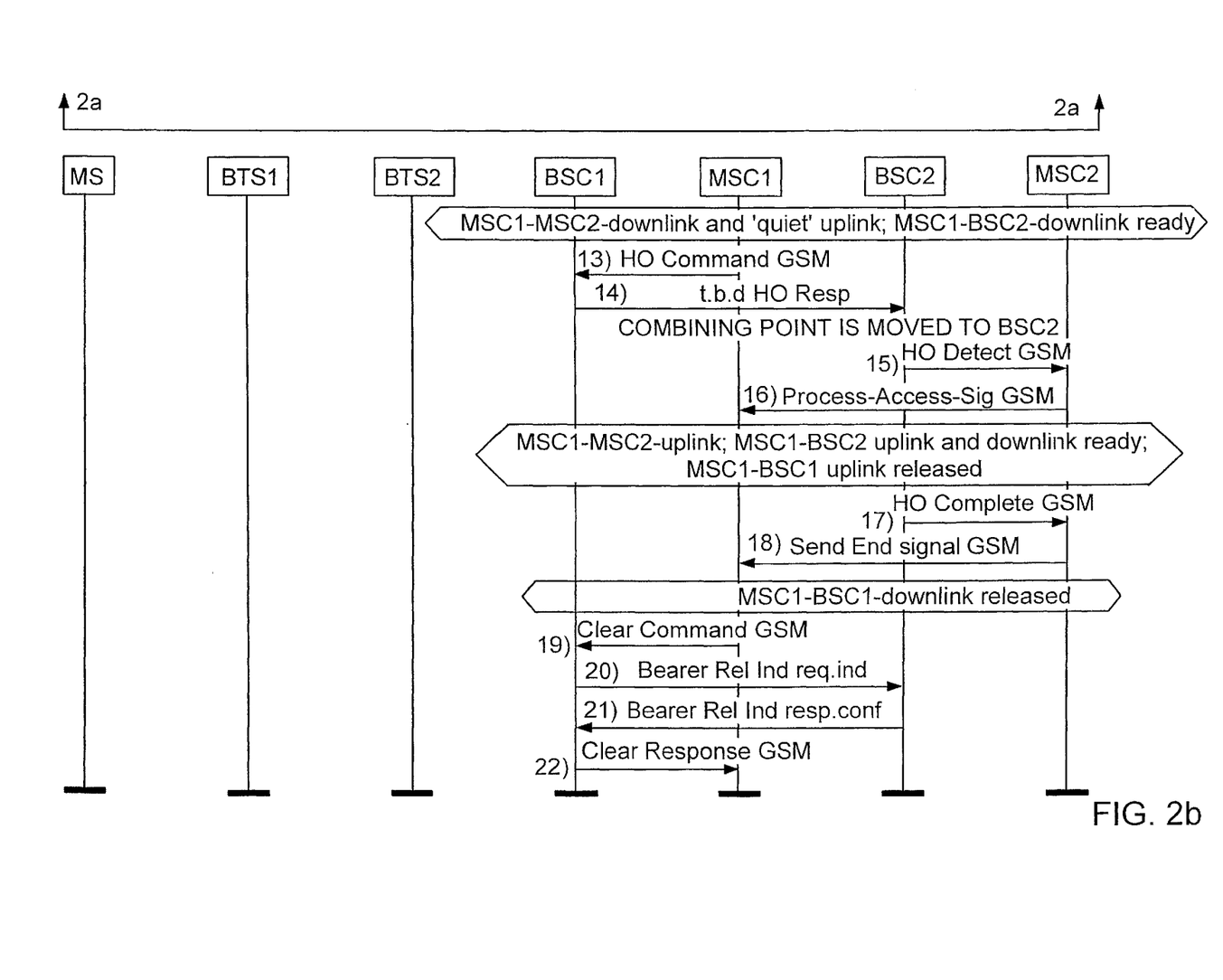

FIGS. 2a and 2b illustrate the signalling related to handover in the embodiment shown in FIGS. 1a to 1d. The signalling illustrated in FIGS. 2a to 2b generally corresponds to the signalling used in handover in the GSM mobile communication network.

The starting point in FIGS. 2a to 2b is similar to that in FIG. 1b, i.e. signals from the mobile station MS are received at both base stations BTS1 and BTS2. The mobile station then moves closer to the base station BTS2, a change of macro diversity path being thereby initiated, as shown in FIGS. 2a to 2b.

At steps 1 to 3 of FIGS. 2a to 2b, the mobile station MS detects that the connection it has to the base station BTS1 drops, at some point, below a predetermined threshold value. The MS therefore informs the base station controller BSC1 that the macro diversity path to the mobile switching centre MSC1 needs to be released. The base station controller BSC1 then detects that there is another macro diversity path controlled by a second base station controller BSC2 and a second mobile switching centre MSC2. The base station controller BSC1 thus informs the base station controller BSC2 that a handover command will be coming (so that the base station would not obey it).

At points 4 to 7, the base station controller BSC1 disconnects the connection associated with the first macro diversity path between the mobile station MS and the base station BTS1. However, the connection involving the second macro diversity path remains, and the base station BTS1 thereafter forwards the signals it receives from the mobile station MS only to the second base station controller BSC2.

At points 8 to 9, the base station controller BSC1 requests a handover from the mobile switching centre MSC1. The mobile switching centre detects that the handover in question will take place between two mobile switching centres, so it initiates a normal handover between two GSM mobile switching centres. Consequently, a connection between the second mobile switching centre MSC2 and the second base station controller BSC2 is established.

At points 10 to 11 the mobile switching centre MSC2 requests the base station controller BSC2 to establish a radio connection between the base station BTS2 and the mobile station MS. Since this radio connection already exists, the base station controller BSC2 only acknowledges that the radio connection is established.

At points 12 to 14 the mobile switching centre MSC2 informs the mobile switching centre MSC1 that a handover can be carried out. The base station controller BSC1 is then informed that the base station controller BSC2 is ready for handover, and the BSC1 asks the BSC2 to start diversity combining. The combining point is thus transferred from the base station controller BSC1 to the base station controller BSC2.

At points 15 to 18 the connection between the base station controller BSC2 and the mobile switching centre MSC2 is activated, and this route is then used for forwarding signals received from the mobile station MS to the mobile switching centre MSC2. The mobile switching centre MSC2 informs the mobile switching centre MSC1 that the old connection (to the base station controller BSC1) can be released.

At points 19 to 22 the mobile switching centre MSC1 requests the base station controller BSC1 to release the connection between the base station controller BSC1 and the mobile switching centre MSC1, the signals received from the mobile station via the base station BTS1 being thereafter forwarded to the mobile switching centre MSC2 only via the base station controller BSC2.

Figure 3A:
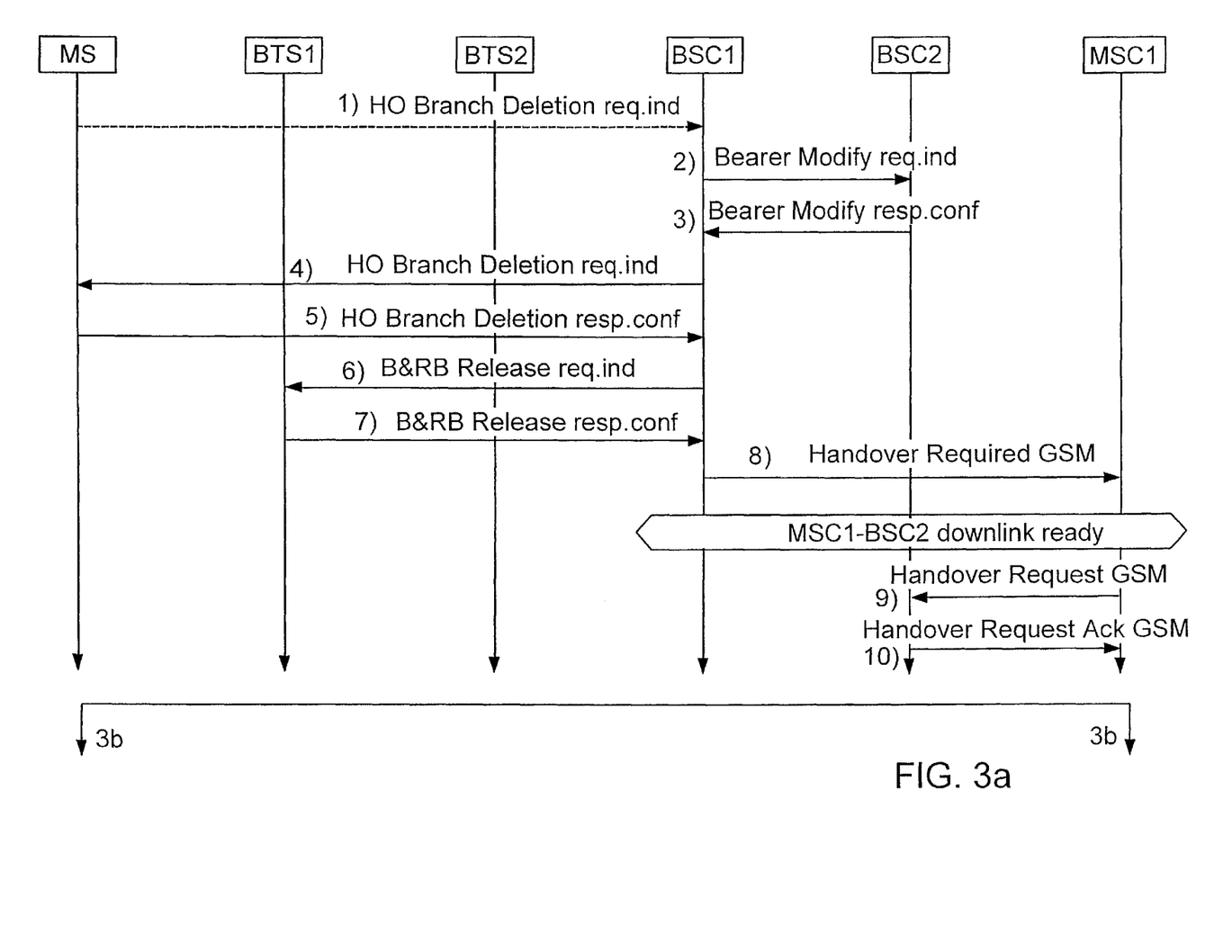
FIGS. 3a and 3b illustrate signalling related to handover in a second preferred embodiment of the mobile communication system.
Figure 3B:
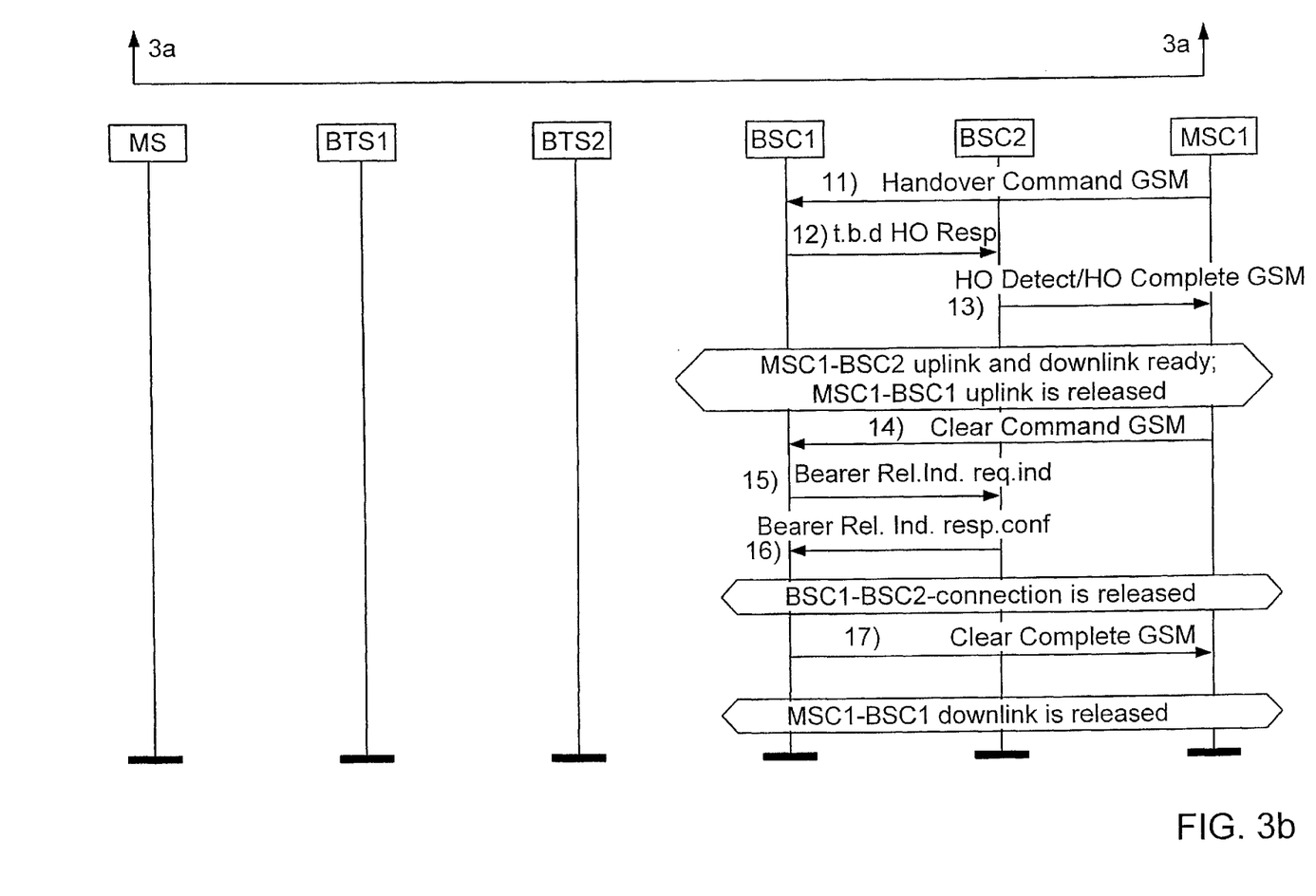

FIGS. 3a and 3b illustrate signalling associated with handover in a second preferred embodiment of the mobile communication system.

The signalling diagrams in FIGS. 3a and 3b relate to a solution in which two base station controllers BSC1 and BSC2 are controlled by one and the same mobile switching centre, whereas the base station controllers of FIGS. 2a and 2b are controlled by separate mobile switching centres. Otherwise the signalling diagrams are largely similar, the description relating to diagrams 2a to 2b being therefore also applicable to the diagrams 3a to 3b.

Figure 4A:
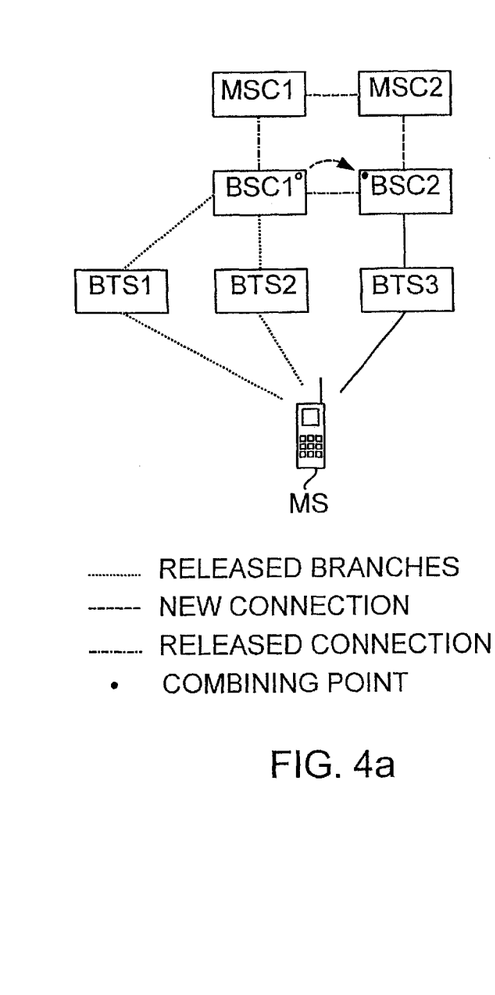
FIGS. 4a to 4c illustrate the transfer of a combining point from a first base station controller to a second base station controller.
Figure 4B:
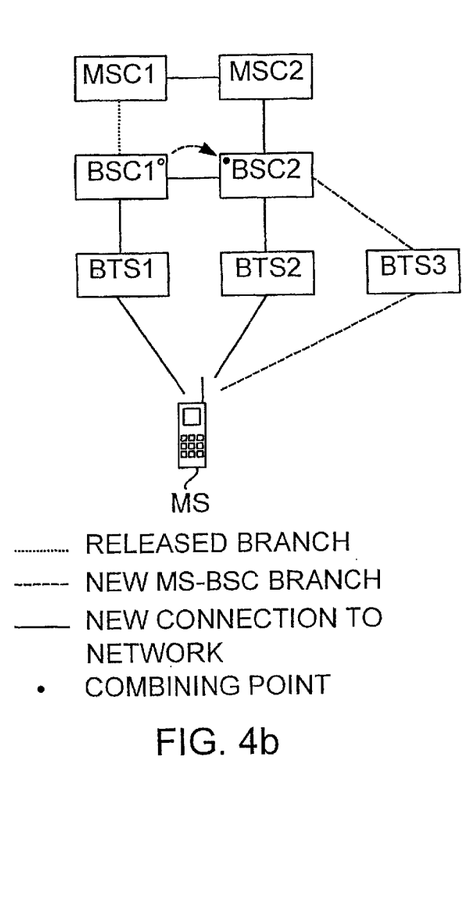
Figure 4C:
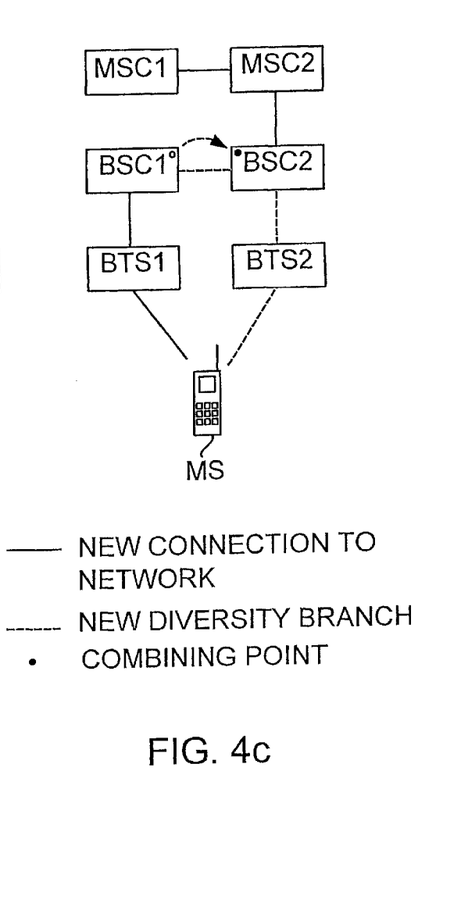

FIGS. 4a to 4c illustrate the transfer of the combining point from the first base station controller to the second base station controller.

FIG. 4a shows the mobile station MS moving further to right, the signals it sends being thus no longer sufficiently well audible via base stations BTS1 and BTS2. The mobile station MS is therefore advantageously transferred so that it is entirely controlled by a base station BTS3 and the base station controller BSC2. Likewise, the combining of the signals received from the mobile station MS, and power control of the mobile station MS should thereafter be carried out at the base station controller BSC2. In the situation shown in FIG. 4a, the mobile station thus carries out a handover transferring the combining point from the base station controller BSC1 to the base station controller BSC2. The procedure in question is triggered by the fact that the signals sent by the mobile station can no longer be received at a sufficiently high quality via the base stations BTS1 and BTS2 controlled by the base station controller BSC1.

FIG. 4b shows a case in which the mobile station MS moves further to right, thus entering the coverage area of the base station BTS3. The mobile station therefore carries out a handover, after which it is controlled by the base station controller BSC2, instead of the base station controller BSC1, the combining point and the power control being transferred to the base station controller BSC2. At the same time, a new connection is established from the base station controller BSC2 to the mobile switching centre MSC2 and the old connection between the mobile switching centre MSC1 and the base station controller BSC1 is released. The factor triggering this event is that, compared with the base station controller BSC1, the base station controller BSC2 controls a greater number of base stations through which signals from the mobile station MS can be received. In other words, the base station controller BSC1 only controls the base station BTS1, through which signals from the mobile station MS can be received, whereas the base station controller BSC2 controls two base stations, BTS2 and BTS3, through which signals from the mobile station MS can be received.

In FIG. 4c the mobile station MS is located in an area between the base stations BTS1 and BTS2, so signals originating from the MS can be received through both base stations. Nevertheless, a handover is carried out, the combining point being transferred in the handover from the base station controller BSC1 to the base station controller BSC2. The procedure takes place as shown in the signalling diagrams of FIGS. 2a and 2b. In FIG. 4c, the procedure is triggered by the significantly better audibility of the mobile station via the base station BTS2 than the base station BTS1.

In accordance with the invention, but as distinct from the above, it can be assumed that the base station controller BSC1 of FIG. 4a carries out diversity combining of signals originating from the mobile station MS and received from the base stations BTS1 and BTS2 and the base station controller BSC2.

The base station controller BSC1 thus carries out diversity combining of signals which originate from the mobile station MS and which it receives from the base stations BTS1 and BTS2. The base station controller BSC2 also receives, via the base station BTS3, signals originating from the mobile station MS. In the diversity combining, the base station controller BSC1 thus takes into account signals received through all the three base stations BTS1 to BTS3.

The combining point being then transferred to the second base station controller BSC2, in a manner shown in FIG. 4a, the second base station controller also initiates diversity combining. This means that the base station controller BSC1 carries out diversity combining of signals received via the base stations BTS1 and BTS2. The signal obtained as a result of the diversity combining is fed by the first base station controller to the second base station controller BSC2. The second base station controller, in turn, applies diversity combining to signals originating from the mobile station MS and received from the base station BTS3 and the first base station controller BSC1. The base station controller BSC2 feeds the signal obtained as a result of the diversity combining to the mobile switching centre MSC2.

It is to be understood that the above description and the related Figures are only intended to illustrate the present invention. It will be apparent to those skilled in the art that many variations and modifications can be made to the invention without departing from the scope and spirit of the invention disclosed in the attached claims.

What is claimed is:

1. A method for applying diversity reception in a mobile communication system comprising:

receiving signals of a specific mobile station via at least two separate base stations, the base stations being arranged to forward the signals they receive to at least two separate base station controllers, and arranging a first base station controller to forward the signals received from a base station to a second base station controller, which is arranged to apply diversity combining to forward the signals received from a base station and from the first base station controller further to a mobile switching centre via a first telecommunication connection, whereby a handover involving said mobile station comprises exchanging functions between said first and second base station controller, said exchanging of functions involving:

arranging the second base station controller to disconnect said first telecommunication connection to said mobile switching centre, and to forward the signals received from the base station to the first base station controller;

setting up a second telecommunication connection from the first base station controller to said mobile switching centre or to an other mobile switching centre; and arranging the first base station controller to apply diversity combining to forward the signals received from the base station and from the second base station controller further via said second telecommunication connection to said mobile switching centre or to said other mobile switching centre.

2. A method according to claim 1, wherein the first base station controller receives signals from said mobile station at least via two separate base stations;

the first base station controller applies diversity combining to forward the signals received from said at least two base stations to the second base station controller; and the second base station controller applies diversity combining to forward the signals received from the first base station controller and the base station further to the mobile switching centre.

3. A method according to claim 1, wherein said mobile communication system comprises at least a first and a second mobile switching centre, the first base station controller being arranged to forward received signals to the first mobile switching centre, and the second base station controller being arranged to forward received signals to the second mobile switching centre.

4. A mobile communication system comprising
at least one mobile switching centre; and
at least a first and a second base station controller which have a data transmission connection with each other and which are arranged to simultaneously receive signals from a specific mobile station, via a first and a second base station, respectively, which have a data transmission connection with said first and second base station controller, the first base station controller is arranged to forward the signals received from the first base station to the second base station controller, which is arranged to apply diversity combining to forward the signals received from the second base station and from the first base station controller further to said at least one mobile switching centre via a first telecommunication connection, and in connection with handover, the base station controllers are arranged to exchange functions, said exchanging of functions involving disconnecting of said first telecommunication connection between said second base station controller and said mobile switching centre and establishing a second telecommunication connection between said first base station controller and said mobile switching centre or another mobile switching centre, whereby the second base station controller, which earlier applied diversity combining, thereafter forwards the signals received from the second base station to the first base station controller, and the first base station controller thereafter forwards the signals received from the first base station and from the second base station controller further to said at least one mobile switching centre or to said another mobile switching centre.

5. A mobile communication system according to claim 4, wherein
the first base station controller receives the signals originating from said mobile station at least via two separate base stations simultaneously;

the first base station controller applies diversity combining to forward the signals received from said at least two base stations to the second base station controller; and the second base station controller applies diversity combining to forward the signals received from the first base station controller and the signals received from the second base station further to said at least one mobile switching centre.

6. A mobile communication system according to claim 4, wherein the system comprises a second mobile switching centre and that said base station controllers are arranged to forward the signals to separate mobile switching centres.

7. A base station controller of a mobile communication system, the base station controller comprising means for receiving signals from a mobile station via a base station having a data transmission connection with the base station controller, the base station controller can be set at least at two alternative modes:

in a first mode, combining means of the base station controller are arranged to apply diversity combining to forward the signals received from the mobile station via said base station and from a second base station controller to a mobile switching centre via a telecommunication connection; and, in a second mode, the base station controller is arranged to forward the signals received from said mobile station via said base station to said second base station controller, said base station controller being configured to disconnect said telecommunication connection when entering said second mode and establishing said telecommunication connection when entering said first mode.

8. A base station controller according to claim 7, wherein in connection with a handover involving said mobile station, said base station controller is arranged to switch from the first mode to the second, or vice versa.

* * * * *